Feb. 26, 1929.

G. C. CARHART 1,703,473

TRANSMISSION MECHANISM

Filed April 7, 1924    2 Sheets-Sheet 1

*Fig.1.*

Inventor

George C Carhart

By Parsons Bodell

Feb. 26, 1929.　　　　　　　　　　　　　　　　　　　　　1,703,473
G. C. CARHART
TRANSMISSION MECHANISM
Filed April 7, 1924　　　　　　2 Sheets-Sheet 2
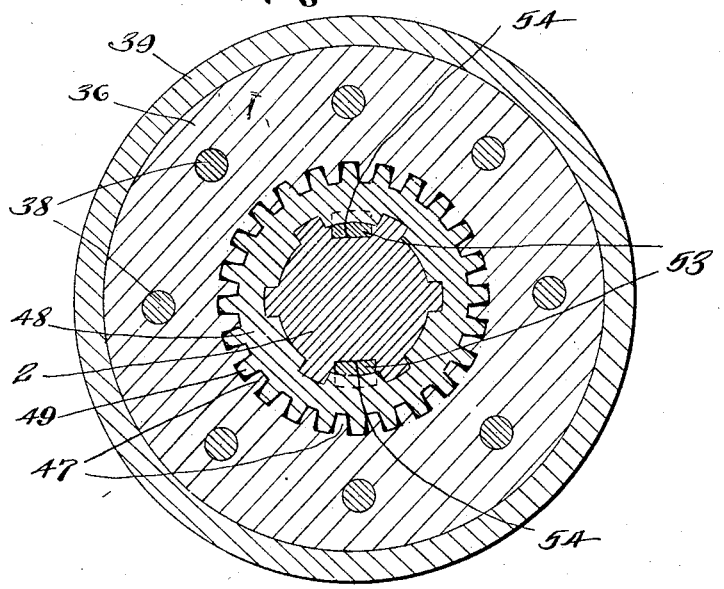
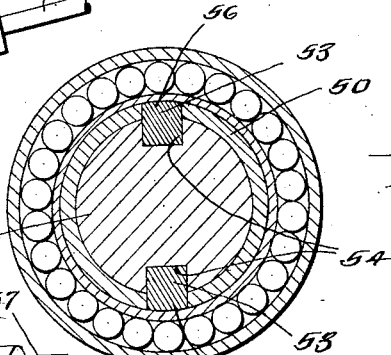
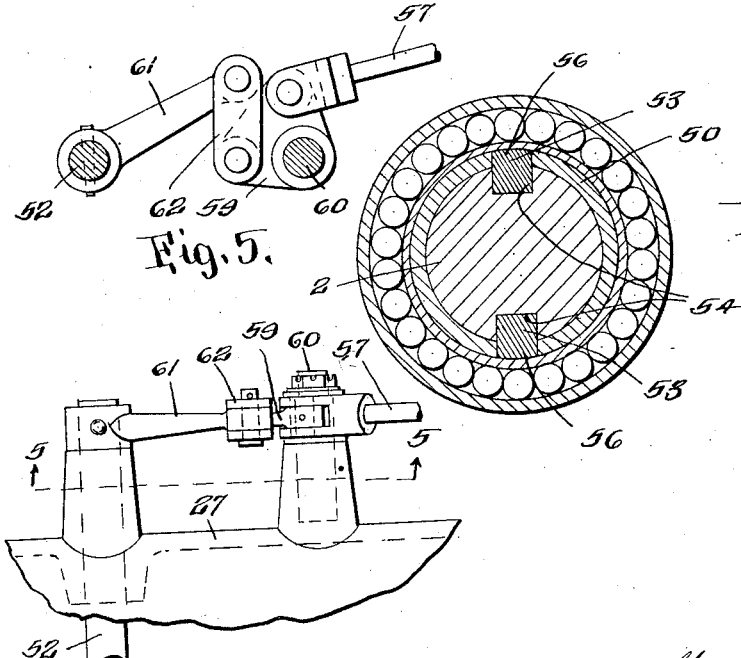
INVENTOR.
George C. Carhart.
BY
Parsons & Bodell.
ATTORNEYS.

Patented Feb. 26, 1929.

1,703,473

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

TRANSMISSION MECHANISM.

Application filed April 7, 1924. Serial No. 704,572.

This invention relates to transmission mechanisms such as are used in motor vehicles, and has for its object a particularly simple and efficient clutch mechanism for synchronizing relative rotation of the driving and driven parts, after the gear shifting operations and for relieving the shiftable parts of the change speed gearing from all driving force during the gear shifting operations.

The invention consists in the novel features and in the combinations and constructions hereinafter set forth and claimed.

In describing this invention reference is had to the accompanying drawings in which like characters designate corresponding parts in all the views.

Figure 1 is a vertical sectional view of a synchronizing clutch embodying my invention, contiguous portions of a transmission gearing being also shown.

Figure 2 is an enlarged sectional view on line 2—2, Fig. 1.

Figure 3 is a sectional view on the plane of line 3—3, Fig. 1.

Figure 4 is a fragmentary plan view of a portion of the operating means for the rear clutches, the contiguous parts of the casing for such clutches being also shown.

Figure 5 is a sectional view on line 5—5, Fig. 4.

2 is the driven shaft of the mechanism. The driven shaft 2 is journalled in a bearing in the rear wall 26 of the casing 27, mounted on the rear wall of the casing 7, the shaft 2 preferably having a pilot bearing at 28, in the transmission shaft 6. The case 27 is secured to the rear wall of the transmission gear casing 7 in any suitable manner as by screws 29.

The shafts 6 and 2 are connected by a synchronizing clutch and a positive clutch. The synchronizing clutch between the shafts 6 and 2, is preferably of the conical friction type, and includes sections mounted respectively on the shafts 6 and 2, and rotatable therewith, one of these sections being shiftable axially, as the section mounted on the shaft 2.

36 designates the section mounted on the transmission shaft 6, it being here shown as an inner member or drum of a conical friction clutch and as mounted on the enlarged hollow head 37 formed integral with the rear end of the transmission shaft 6, and located outside of the gear case 7 and within the casing 27, the drum 36 being secured to the head 37 as by rivets 38.

39 is the section mounted on, and rotatable with, the shaft 2 and also slidable axially thereof, it being in the form of an outer drum having a head 40 which is slidably interlocked with the driven shaft 2 which is a spline shaft. The sections 36 and 39 are held in engagement by springs 41 interposed between a spring abutment 42 splined on the shaft 2, and the head 40, and tending to thrust the head 40 to the left to engage the outer section 39 with the inner section 36.

A thrust bearing 43 is interposed between the spring abutment 42 and the inner drum 36.

As here shown the annular wall of the section 39 is formed with notches 44 in its rear margin and the head 40 is formed with tongues 45 interlocked in such notches, the head being secured to the annular wall in any suitable manner as by a lock or snap ring 46.

The third clutch for positively connecting and disconnecting the shafts 6 and 2 comprises internal teeth 47 similar to gear teeth, formed on the inner section 36 of the friction clutch and a head 48 interlocked with the shaft 2 and slidable axially thereof and having peripheral teeth 49 movable into and out of interlocking engagement with the teeth 47. The head 48 is splined to the shaft 2. The means for shifting the friction clutch section 39 and the head 48 comprises a collar 50 slidable axially of the shaft 2, a yoke or fork 51 mounted on a rock shaft 52 journalled in the casing 27 and extending to the outside thereof, and a connection between the clutch pedal and the rock shaft 52. The collar 50 is normally spaced apart from the head 40 of the friction clutch, so that there is a lost motion between the collar 50 and the head 40, and the collar 50 is connected to the head 48 to shift the same by means of one or more keys 53, slidable in lengthwise grooves 54 in the periphery of the shaft 2, and interlocked at 55 at their front ends with the head 48, and having tongues or shoulders 56 at their inner ends extending into radial openings in the collar 50.

The shaft 52 is preferably operated from the main clutch pedal of the motor vehicle equipped with this mechanism. The connection between this mechanism and the shaft 52 comprises a link 57 pivoted at its front end to the clutch pedal, and connected at its rear end through suitable means to the shaft 52. It is here shown as connected at its rear end to an angle lever 59, mounted on a stud 60 supported by the case 27, and this angle lever 59 is connected to a rock arm 61 on the outer end of the shaft 52, by a link 62. During depression of the clutch pedal to partially or fully disengage the main clutch, the angle lever 59 is rocked to straighten the link 62 and immediately disengages the positive clutch head 48 from the teeth 47, and thereafter causes the collar 50 to engage the head 40 of the shiftable friction clutch section 39 and thus disengage the friction clutch sections. When the clutch pedal is let in or released the friction clutch section 39 fully engages the clutch section 36 and thereafter the positive clutch head 48 interlocks with the teeth 47. Thus when the clutch pedal is depressed the transmission gearing is relieved of all driving force and the gear shifting operation is performed while the gears are idle or nearly idle. When the clutch pedal is released to let in or engage the main clutch the friction clutch sections 36 and 39 are engaged, and thus synchronize any relative rotation of the shafts 2 and 6, and thereafter at the end of the "in" movement of the clutch pedal 34 the positive clutch head 48 is engaged with the teeth 47 after such synchronizing has been effected.

What I claim is:

1. In a transmission mechanism, the combination of a transmission shaft, and a driven shaft, arranged in axial alignment, a clutch connecting the shafts including sections mounted respectively on the shafts, the section mounted on the transmission shaft comprising an inner drum having an outer friction clutch surface, the driven shaft having lengthwise grooves and keys slidable in some of the grooves, the other clutch section comprising a head slidable on the driven shaft and secured to the inner ends of the keys, the inner drum also having a hollow hub having internal teeth, the head having external teeth being slidable axially of the driven shaft in the hollow hub, to carry the external teeth into and out of mesh with the internal teeth on said hub, the other clutch section in addition to said externally toothed head including an outer drum having its cylindrical wall provided with an inner friction surface coacting with the peripheral surface of the inner drum, the outer drum being also shiftable axially, and having a hub enclosing the driven shaft and interlocked with the other of the grooves of the driven shaft, said keys and the head having axial movement relatively to the outer drum, and the outer drum having its hub arranged in the path of the head to be engaged thereby during shifting of the keys in one direction to declutch, spring means acting on the outer drum to shift it into clutching position, and means for actuating the keys.

2. In a transmission mechanism, a wall of a gear casing, a transmission shaft and a driven shaft arranged end to end in axial alinement, the former being journalled in said wall, a housing in which the outer end of the driven shaft is journalled, the housing being mounted on said wall, a clutch connecting said shafts comprising sections on said shafts respectively, said sections comprising coacting friction members and positively interlocking members, the friction member mounted on the transmission shaft being formed with a hollow hub having internal teeth around the driven shaft and located on the transmission shaft adjacent said wall and within the housing, the hub also having an outwardly extending web portion from the hub formed with the internal teeth which outwardly extending portion forms a part of the friction clutch means, the section mounted on the driven shaft including an externally toothed head mounted thereon to rotate therewith and to slide axially thereof to carry its external teeth out of and into engagement with the internal teeth of said hub, the friction member associated with said head being shiftable axially of the driven shaft and having a hub mounted on said driven shaft and interlocked therewith and slidable axially thereof and having its hub arranged in the path of the head to be shifted thereby in one direction to disengage the clutch, said friction member associated with the head coacting with the friction means carried by the hollow hub, and spring means acting on the shiftable friction section to shift it into clutching position and means for shifting the toothed head.

In testimony whereof, I have hereunto signed my name, at Syracuse, in the county of Onondaga, and in the State of New York, this 5th day of April, 1924.

GEORGE C. CARHART.